United States Patent
Kaya et al.

(10) Patent No.: US 10,271,103 B2
(45) Date of Patent: Apr. 23, 2019

(54) RELEVANCE TABLE AGGREGATION IN A DATABASE SYSTEM FOR PROVIDING VIDEO RECOMMENDATIONS

(71) Applicant: HULU, LLC, Santa Monica, CA (US)

(72) Inventors: Lutfi Ilke Kaya, Santa Monica, CA (US); Jinyu Yao, Beijing (CN); Heng Su, Beijing (CN); Wenkui Ding, Beijing (CN); Bangsheng Tang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 25 days.

(21) Appl. No.: 15/019,672

(22) Filed: Feb. 9, 2016

(65) Prior Publication Data

US 2016/0234555 A1    Aug. 11, 2016

Related U.S. Application Data

(60) Provisional application No. 62/114,695, filed on Feb. 11, 2015.

(51) Int. Cl.
*G06F 3/00* (2006.01)
*G06F 13/00* (2006.01)
(Continued)

(52) U.S. Cl.
CPC ....... *H04N 21/4668* (2013.01); *H04N 21/251* (2013.01); *H04N 21/252* (2013.01);
(Continued)

(58) Field of Classification Search
CPC .......... H04N 21/4755; H04N 21/4665; H04N 21/4758; H04N 21/4756; H04N 21/25891; H04N 21/251; H04N 21/4668
See application file for complete search history.

(56) References Cited

U.S. PATENT DOCUMENTS 6,029,195 A  *  2/2000  Herz ................. G06F 17/30867
                                                348/E7.056
8,145,679 B1     3/2012  Balaja et al.
(Continued)

FOREIGN PATENT DOCUMENTS

WO    2007135436 A1    11/2007

OTHER PUBLICATIONS

International Search Report and the Written Opinion of the International Searching Authority, dated May 24, 2016, from a corresponding foreign application, PCT/US2016/017154.
(Continued)

*Primary Examiner* — Nasser M Goodarzi
*Assistant Examiner* — Patrick A Ryan
(74) *Attorney, Agent, or Firm* — Fountainhead Law Group P.C.

(57) ABSTRACT

In one embodiment, a method generates a plurality of sub-relevance tables including a first set of relevance values between media programs. Each table models relevance values for a single feature in a plurality of features. Labeling results are received that include a second set of relevance values between the media programs. The method combines the sub-relevance tables into a single relevance table that includes a third set of relevance values between the media programs for the plurality of features. The combining generates weights for each of the sub-relevance tables based on the second set of relevance values for the labeling results and the first set of relevance values of the sub-relevance tables that are used to generate the third set of relevance values. A recommendation is provided to a user using the third set of relevance values from the single relevance table and a characteristic of the user.

20 Claims, 8 Drawing Sheets

|   | MP #1 | MP #2 | MP #3 | 602-1 |
|---|---|---|---|---|
| MP #1 | 604-1 | 0.5 | 0.9 | |
| MP #2 | 0.4 | | 0.8 | |
| MP #3 | 0.4 | 0.7 | | |

604-2

|   | MP #1 | MP #2 | MP #3 | 602-2 |
|---|---|---|---|---|
| MP #1 | 605-1 | 0.7 | 0.7 | |
| MP #2 | 0.2 | | 0.8 | |
| MP #3 | 0.8 | 0.9 | | |

605-2

|   | MP #1 | MP #2 | MP #3 | 606 |
|---|---|---|---|---|
| MP #1 | 608-1 | 0.6 | 0.8 | |
| MP #2 | 0.25 | | 0.8 | |
| MP #3 | 0.75 | 0.8 | | |

608-2

(51) Int. Cl.
*H04N 5/445* (2011.01)
*H04N 21/466* (2011.01)
*H04N 21/25* (2011.01)
*H04N 21/258* (2011.01)
*H04N 21/475* (2011.01)

(52) U.S. Cl.
CPC ... *H04N 21/25891* (2013.01); *H04N 21/4665* (2013.01); *H04N 21/4667* (2013.01); *H04N 21/4755* (2013.01); *H04N 21/4756* (2013.01); *H04N 21/4758* (2013.01)

(56) References Cited

U.S. PATENT DOCUMENTS

| | | | |
|---|---|---|---|
| 2002/0087979 A1* | 7/2002 | Dudkiewicz | G06F 17/30017 725/34 |
| 2003/0106058 A1* | 6/2003 | Zimmerman | H04N 7/163 725/46 |
| 2003/0182249 A1* | 9/2003 | Buczak | H04N 7/16 706/15 |
| 2004/0003401 A1* | 1/2004 | Gutta | H04N 7/165 725/46 |
| 2005/0165782 A1* | 7/2005 | Yamamoto | G06F 17/30017 |
| 2007/0192792 A1 | 8/2007 | Nagamatsu | |
| 2009/0006368 A1 | 1/2009 | Mei et al. | |
| 2009/0100094 A1 | 4/2009 | Verdaguer et al. | |
| 2010/0030713 A1 | 2/2010 | Simpson et al. | |
| 2010/0169342 A1* | 7/2010 | Kenedy | G06F 17/30867 707/758 |
| 2011/0125783 A1* | 5/2011 | Whale | G06F 17/30029 707/769 |
| 2011/0153663 A1 | 6/2011 | Koren et al. | |
| 2014/0012859 A1 | 1/2014 | Heilprin et al. | |
| 2014/0282656 A1* | 9/2014 | Belyaev | H04N 21/25841 725/14 |
| 2015/0156545 A1* | 6/2015 | Kveton | H04N 21/44218 725/14 |
| 2015/0339687 A1* | 11/2015 | Ioannidis | G06Q 30/0241 705/7.33 |

OTHER PUBLICATIONS

Extended European Search Report & Opinion for EP Application 16749711.4 dated Aug. 13, 2018, 8 pages.

* cited by examiner

|  | MP #1 | MP #2 | MP #3 | 602-1 |
|---|---|---|---|---|
| MP #1 | 604-1 | 0.5 | 0.9 | |
| MP #2 | 0.4 | | 0.8 | |
| MP #3 | 0.4 | 0.7 | | |

604-2

|  | MP #1 | MP #2 | MP #3 | 602-2 |
|---|---|---|---|---|
| MP #1 | 605-1 | 0.7 | 0.7 | |
| MP #2 | 0.2 | | 0.8 | |
| MP #3 | 0.8 | 0.9 | | |

605-2

|  | MP #1 | MP #2 | MP #3 | 606 |
|---|---|---|---|---|
| MP #1 | 608-1 | 0.6 | 0.8 | |
| MP #2 | 0.25 | | 0.8 | |
| MP #3 | 0.75 | 0.8 | | |

RELEVANCE TABLE AGGREGATION IN A DATABASE SYSTEM FOR PROVIDING VIDEO RECOMMENDATIONS

CROSS REFERENCE TO RELATED APPLICATIONS

The present disclosure claims priority to U.S. Provisional App. No. 62/114,695, entitled "Relevance Table Aggregation for Generating Recommendations", filed Feb. 11, 2015, the contents of which is incorporated herein by reference in its entirety.

BACKGROUND

Companies provide a library of videos that users can browse. Often, the library of videos is very large and it is important that a user be able to find a video quickly and easily. Sometimes, a user knows exactly what video he/she wants to watch and can find the video easily. Once finding the video, the user can request the video on-demand. However, a user may not always know what video he/she would like to watch. If user has to search too long and just cannot find a video, the user may stop using the service, which is undesirable.

SUMMARY

In one embodiment, a method generates a plurality of sub-relevance tables including a first set of relevance values between media programs being provided by a video delivery service. Each table models relevance values for a single feature in a plurality of features. Labeling results are received that include a second set of relevance values between the media programs, the labeling results based on user input. The method combines the plurality of sub-relevance tables into a single relevance table that includes a third set of relevance values between the media programs for the plurality of features. The combining generates weights for each of the plurality of sub-relevance tables based on the second set of relevance values for the labeling results and the first set of relevance values of the plurality of sub-relevance tables that are used to generate the third set of relevance values. A recommendation is provided to a user using the video delivery service, the recommendation generated using the third set of relevance values from the single relevance table and a characteristic of the user.

In one embodiment, a non-transitory computer-readable storage medium contains instructions, that when executed, control a computer system to be configured for: generating a plurality of sub-relevance tables including a first set of relevance values between media programs being provided by a video delivery service, wherein each table models relevance values for a single feature in a plurality of features; receiving labeling results including a second set of relevance values between the media programs, the labeling results based on user input; combining the plurality of sub-relevance tables into a single relevance table that includes a third set of relevance values between the media programs for the plurality of features, wherein combining generates weights for each of the plurality of sub-relevance tables based on the second set of relevance values for the labeling results and the first set of relevance values of the plurality of sub-relevance tables that are used to generate the third set of relevance values; and providing a recommendation to a user using the video delivery service, the recommendation generated using the third set of relevance values from the single relevance table and a characteristic of the user.

In one embodiment, an apparatus includes: one or more computer processors; and a non-transitory computer-readable storage medium comprising instructions, that when executed, control the one or more computer processors to be configured for: generating a plurality of sub-relevance tables including a first set of relevance values between media programs being provided by a video delivery service, wherein each table models relevance values for a single feature in a plurality of features; receiving labeling results including a second set of relevance values between the media programs, the labeling results based on user input; combining the plurality of sub-relevance tables into a single relevance table that includes a third set of relevance values between the media programs for the plurality of features, wherein combining generates weights for each of the plurality of sub-relevance tables based on the second set of relevance values for the labeling results and the first set of relevance values of the plurality of sub-relevance tables that are used to generate the third set of relevance values; and providing a recommendation to a user using the video delivery service, the recommendation generated using the third set of relevance values from the single relevance table and a characteristic of the user.

The following detailed description and accompanying drawings provide a better understanding of the nature and advantages of particular embodiments.

DETAILED DESCRIPTION

Described herein are techniques for a database table generation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

When operating a video delivery service, a company can gather information for a user. As more information is learned about the user, the company can recommend media programs to the user that may be relevant to what the user may want to watch. This may encourage the user to view more media programs on the company's service. However, it is important to recommend media programs that the user would actually be interested in.

The video delivery service may create different relevance tables from different features based on the user using the video delivery service. Also, the service may create other relevance tables based on features of the media programs themselves without any user-specific customization. These relevance tables may include watch behavior, search behavior, show topics, and show metadata. The relevance tables capture a nature of relationships between media programs that are being offered on the video delivery service. To generate these relevance tables, each relevance table may model one feature in its own individual table. For example, the relevance table may be a real value score matrix that may have all the media programs on the rows and columns and each cell carries a positive real value score that represents how similar the two media programs are to each other based on a single feature. That is, for the watch behavior, a first score quantifies how relevant a first media program is to a second media program in a first sub-relevance table. Also, for the search behavior, a second score quantifies how relevant the first media program is to the second media program in a second sub-relevance table. The values in the second sub-relevance table do not take into account watch behavior.

Particular embodiments analyze the sub-relevance tables and determine an optimal way of combining the relevance tables into a single relevance table. This includes using labeling results from users and also analyzing the content of the relevance tables. The single relevance table can then be adjusted based on user feedback from the recommendations. A recommendation system can then use the single relevance table to provide recommendations to users using the video delivery system.

Figure 1:
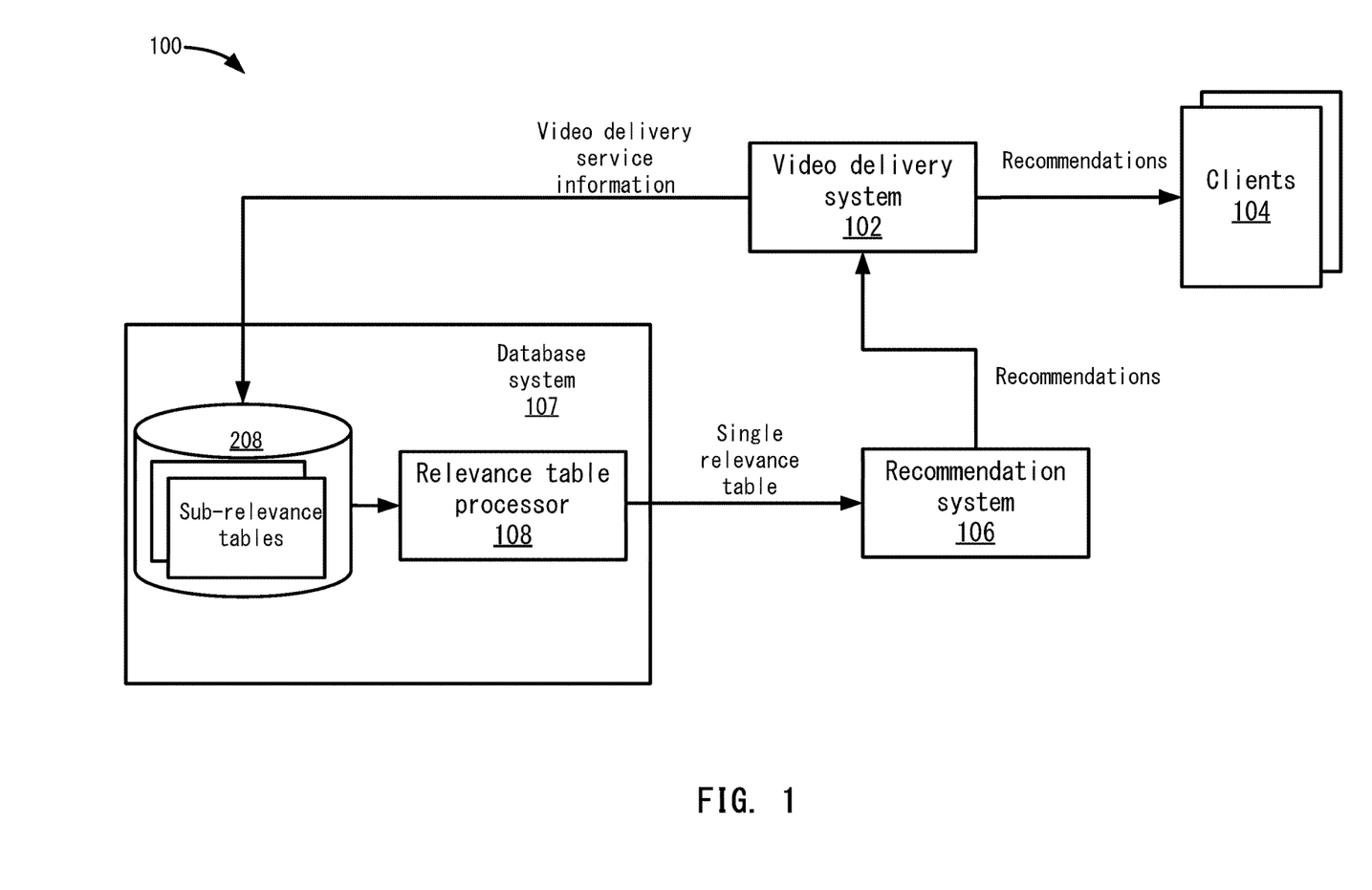
FIG. 1 depicts a simplified system for delivering media programs to users and providing recommendations to the users according to one embodiment.

FIG. 1 depicts a simplified system 100 for delivering media programs to users and providing recommendations to the users according to one embodiment. Video delivery system 102 may deliver media programs to clients 104. A media program may include a television show or movie, any video, or a category of videos. An implementation of video delivery system 102 is described in more detail below.

In one embodiment, users may use clients 104 to request media programs from video delivery system 102. Video delivery system 102 may offer the library of videos to users. As described above, users may search video delivery system 102 for videos and request them on-demand. Additionally, the video delivery service may include a recommendation system 106 that can recommend media programs to the users. In one embodiment, recommendation system 106 recommends media programs based on a similarity to other media programs. For example, recommendation system 106 may recommend a first video based on the user watching a second video that is considered similar to the first video.

Video delivery system 102 may generate video delivery service information, such as user behavior information or media program information for the video delivery service. A database system 107 may generate sub-relevance tables that are stored in database storage 208 that capture the relationship between media programs for the user behavior or media program information. Each sub-relevance table is based on a single feature. For example, the sub-relevance tables may be generated based on user watch behavior, user search behavior, media program topics, and media program metadata. Some of these sub-relevance tables may be based on the user interaction with the video delivery service. Other sub-relevance tables may not be based on specific user information. For example, video delivery service 102 may analyze the media programs to generate the sub-relevance tables, such as media program topics and media program metadata are used to generate sub-relevance tables. As mentioned above, the sub-relevance table may be a real value score matrix that may have all the media programs on the rows and columns and each cell carries a positive real value score that represents how similar the two media programs are to each other based on a single feature.

Database system 107 processes the sub-relevance tables such that recommendation system 106 can use the single relevance table to provide recommendations. To start, a relevance table processor 108 receives the sub-relevance tables. For recommendation system 106 to provide recommendations to users, recommendation system 106 needs to use a single relevance table that captures the relationships for multiple features from the sub-relevance tables. The single relevance table may improve processing time of the computer as recommendation system 106 can quickly determine a similar show. This may be important when real-time delivery of videos is provided in addition to the scale of video delivery that video delivery service is performing. Using multiple relevance tables to initially capture information from different data sources and algorithms is needed. There are many different data sources and algorithms, which require that the initial capturing of data be stored in multiple relevance tables. Given that the processing each relevance table costs nearly the same amount of time, the real-time processing of many relevance tables is not feasible in the video delivery environment. For example, as users request videos, recommendations should be generated when the request is made. Also, as users view videos, new recommendations should be generated as the videos are viewed or after. Further, when a user logs onto the service, the user can be presented with a list of top ten most relevant videos.

In one embodiment, recommendation system 106 generates a single relevance table for all the features. A "single" relevance table may be a matrix of rows and columns with real valued scored in the cells. However the scores capture the contribution and importance from the values for multiple sub-relevance tables. It will be understood that a single relevance table may be implemented differently in database system 107. For example, one or more tables may be used, but the values included in the single relevance table are for multiple features.

To generate the single relevance table, particular embodiments do not manually weight each sub-relevance table with fixed amounts, such as saying watch behavior is 30% important, search behavior is 20% important, etc. Due to the complexity of the video delivery service, the quality of the sub-relevance tables will change over time as they update with more information. Also, using this fixed model does not capture all the useful information in the relevance tables. For example, some accurate relevance information may be neglected because the overall quality of the sub-relevance table containing it is low. Particular embodiments thus analyze the sub-relevance tables in addition to using labeling results from users and explicit feedback from users to learn the optimal way of combining the sub-relevance tables into a single relevance table. In this way, there is no need to calculate the quality of the tables explicitly. Particular embodiments can combine multiple tables where if a quality of a table is low, that table will have a small weight in our combined relevance table. This smaller quality is determined automatically by a recommendation table processor 108.

Recommendation table processor 108 then generates a single relevance table. The single relevance table may be needed such that recommendation system 106 can generate the recommendations. For example, based on a user's actions on the video delivery service, such as browsing history and watch history, recommendation system 106 may use the single relevance table to generate recommendations. The recommendations may include content recommendations for users, such as auto-play videos or top-ten recommended shows. The recommended shows may be the shows considered most relevant to a user based on all the features and a characteristic or characteristics of the user. For example, the watch history and search history are used to generate the top ten most relevant media programs for the user.

Relevance table processor 108 may use a relevance aggregation process and a relevance adjustment process to generate the single relevance table. The relevance aggregation process and the relevance adjustment process will be described in more detail below.

Relevance Table Processor 108

Figure 2:
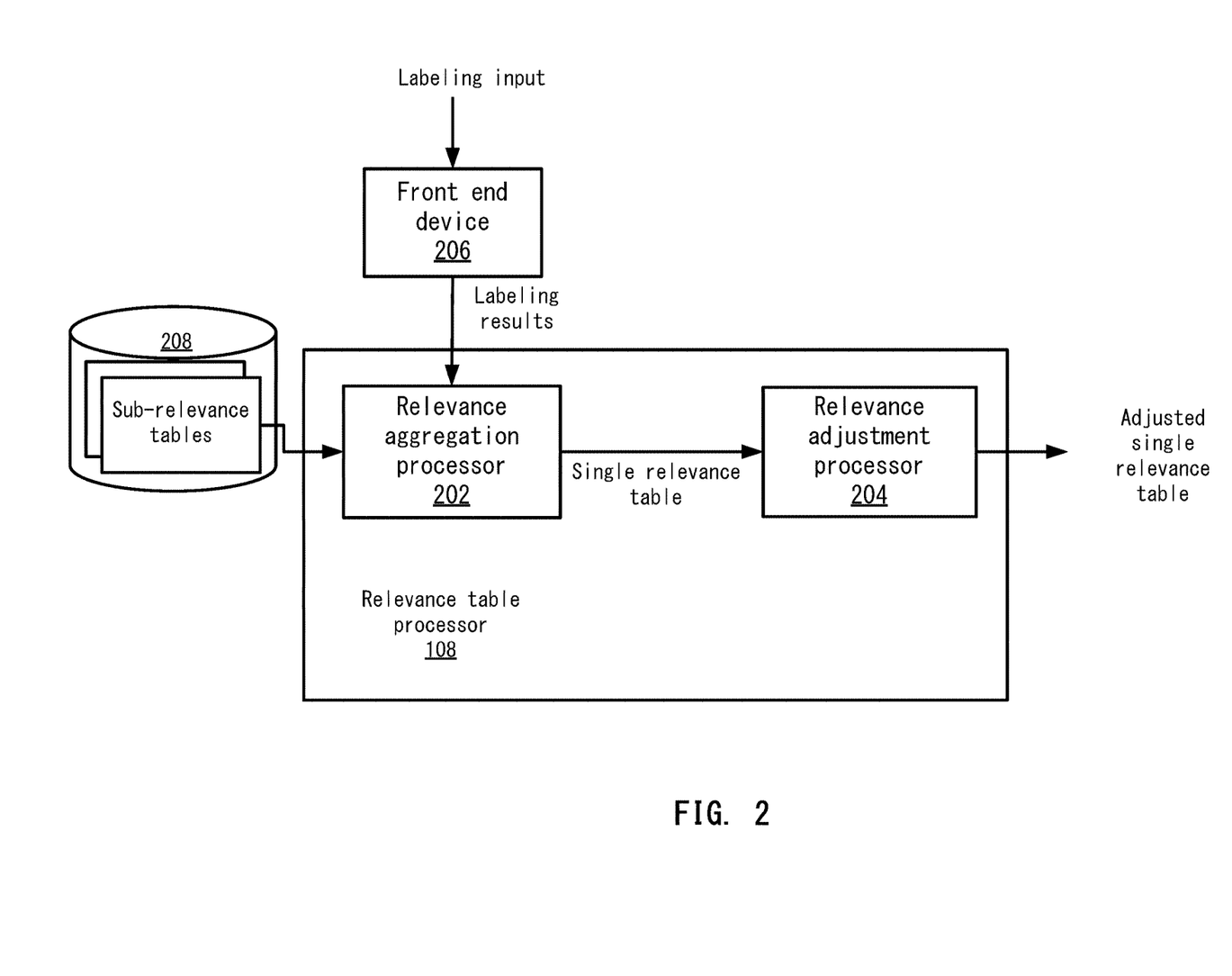
FIG. 2 depicts a more detailed example of relevance table processor 108 according to one embodiment.

FIG. 2 depicts a more detailed example of relevance table processor 108 according to one embodiment. Relevance table processor 108 includes a relevance aggregation processor 202 and a relevance adjustment processor 204. Relevance table processor 108 may be implemented on one or more computing devices. As will be described in more detail below, relevance aggregation process 202 aggregates the sub-relevance tables into a single relevance table and relevance adjustment processor 204 adjusts the single relevance table.

A front end device 206 may collect the labeling results. In one embodiment, front end device 206 may output various questions to users that the user can answer. For example, domain experts that are familiar with the media programs can answer the questions. In one embodiment, front end device 206 may present three different media programs (referred to as a media program "tuple") that is denoted by media program A, media program B, and media program C. These media programs may be different shows, different episodes in a same show, movies, etc. Front end device 206 receives an answer from the user for the question. For example, the question may be "Which media program out of media program B and media program C is more relevant to media program A?" Front end device 206 may allow the user to select media program B or media program C. When media program B and media program C are not relevant, or the user cannot make the decision, the user may skip this question or indicate they are not relevant. Also, instead of selecting media program B or media program C, the user could also assign a relevance value. However, it may be easier to compare two relevance values than decide on a specific relevance value. Also, the same media program tuple can be labeled by different users or even the same user at different times to test if a consensus can be made. Although tuples are described, other methods of garnering a user's input on the similarity of media programs may be used, such as using lists or yes/no questions.

In one embodiment, database storage 208 store different sub-relevance tables. The different sub-relevance tables may be based on different features that may be generated. As discussed above, they may include watch behaviors, search behaviors, media program metadata, or other information. Each sub-relevance table is based on one feature. For example, the user watch behaviors may be based only on the specific user's behavior in watching videos for the video delivery service. The search behaviors may be based only on the specific user searches that are performed. The media program metadata may be generated by the video delivery service and may be the same for all users. These sub-relevance tables may measure the similarity between media programs for the single measure. That is, the sub-relevance table that is generated relates the similarity to a user based on watch behavior. This sub-relevance table does not rate the similarity for watch behavior and search behavior. The sub-relevance table is used for each feature because that is how similarity can be measured. Similarity for multiple measures cannot be measured. Rather, the two values for similarity need to be combined.

Relevance aggregation processor 202 queries database storage 208 and receives the values for the sub-relevance tables from storage 208. Also, relevance aggregation processor 202 receives the labeling results from front end device 206. Relevance aggregation processor 202 can then generate the single relevance table. For example, relevance aggregation processor 202 may use the labeling results as a ground truth and the sub-relevance tables as features to generate the single relevance table. That is, the labeling results are provided by direct observation and the sub-relevance tables are inferred similarity. The labeling results are used to optimally combine the sub-relevance tables.

After the single relevance table is generated, and recommendations are provided to users. Thereafter, the single relevance table may be adjusted. For example, relevance adjustment processor 204 may receive the single relevance table and use other information to adjust the single relevance table. In one embodiment, user selection (e.g., click or mouse) feedback from a user using the video delivery service may be incorporated to adjust the single relevance table. A click-through rate (CTR) on a related product feature, such as a "You may also like" tray showing the recommendations that were generated using the single relevance table, may be used to adjust the single relevance table. For example, if the click-through rate for a recommendation is low, then the relevance of this show may need to be lowered with respect to the show being played.

Generation of Single Relevance Table

Figure 3:
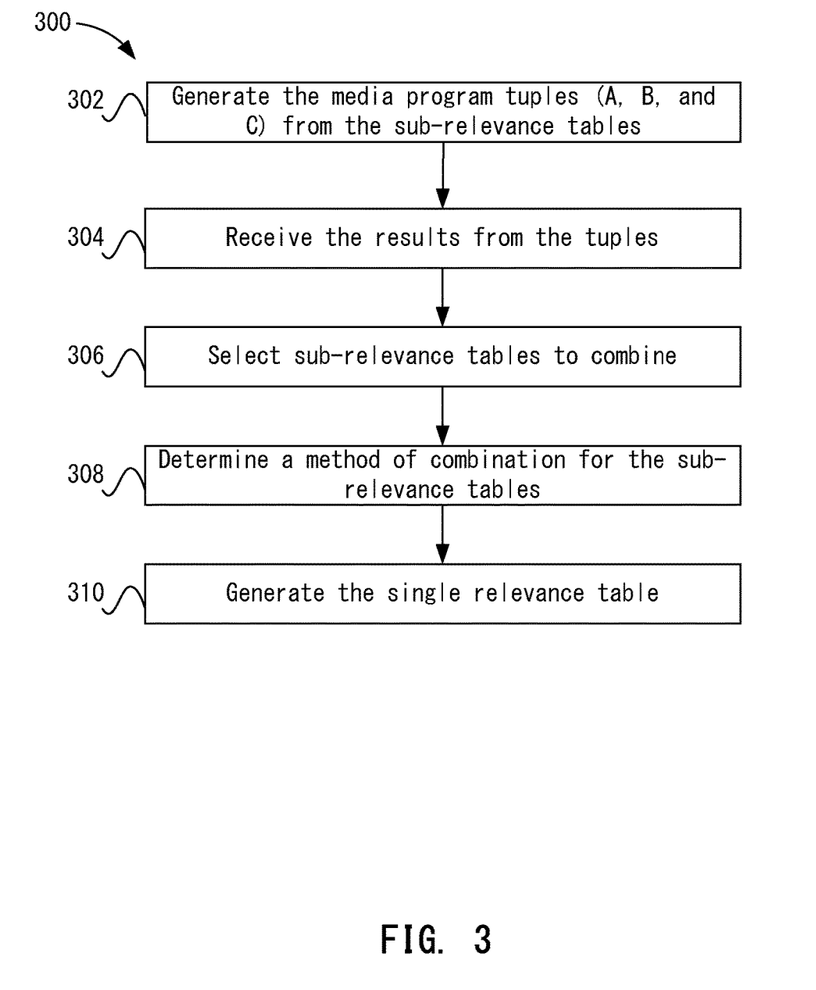
FIG. 3 depicts a simplified flowchart of a method for generating a single relevance table according to one embodiment.

FIG. 3 depicts a simplified flowchart 300 of a method for generating a single relevance table according to one embodiment. At 302, relevance aggregation processor 202 may generate the media program tuples (A, B, and C) from the sub-relevance tables. In one embodiment, the media program tuples may be generated in multiple ways. For example, the top relevant items for a media program A in a single sub-relevance table are used in the tuple. Also, relevance aggregation processor 202 may select the media program tuple by selecting media program B and media program C from the top two relevant items for media program A from all relevance tables. Although the top relevant items are described, a certain percentage or within a threshold difference of media programs to media program A may be selected. For example, media program B and media program D may also be selected as a media program tuple for media program A. Relevance aggregation processor 202 may select the tuples based on analyzing values from one or multiple the sub-relevance tables. A single tuple can be generated from a single table or two tables. However, different relevance tables can be used to generate different tuples.

At 304, relevance aggregation processor 202 receives the results from the tuples. For example, the front end device may output the tuples and user responses are received.

At 306, relevance aggregation processor 202 selects sub-relevance tables to combine. For example, not all sub-relevance tables may be combined into the single relevance table. In one embodiment, only some relevance tables may be relevant to a user.

At 308, relevance aggregation processor 202 determines a method of combination for the sub-relevance tables. For example, relevance aggregation processor 202 may analyze the sub-relevance tables and determine which method of combination will be better. The analysis may use the labeling results to determine which combinations will yield better results. In one embodiment, possible combinations may be a linear combination or a non-linear combination.

At 310, relevance aggregation processor 202 generates the single relevance table. The labeling results are used to weight the importance of the sub-relevance tables. For example, some labeling results may indicate that some relevance tables are more important than others. For example, if the labeling results more closely correspond to values in a sub-relevance table, then that sub-relevance table may be considered more important. The labeling results may not cover all of the data in a sub-relevance table, but relevance aggregation processor 202 can calculate the importance using processes described below. Given the large amount of data that needs to be analyzed, a human user cannot process this data to figure out the importance of the relevance tables. Further, due to the real time nature of providing recommendations, and the number of users using the video delivery service, relevance table processor 108 is needed to generate the single relevance table for each specific user. In one embodiment, relevance aggregation processor 202 may use the following function:

$$L = \sum_{(k,i,j) \in P} \frac{1}{1 + \exp(\alpha(F(x_{k,i}) - F(x_{k,j})))},$$

where (k, i, j) is the labeling result showing that the user prefers media program i to media program j for source media program k; $x_{k,i}$ is the vector containing the relevance values from media program k to media program i in all sub-relevance tables; $\alpha$ is a scaling parameter, P is the set of labeling results, and F( ) is a scoring function with respect to the single relevance table, $x_{k,j}$ is similarly the vector containing the relevance values from media program k to media program j in all sub-relevance tables. Relevance aggregation processor 202 minimizes the objective L and gets the optimal function F( ). The function measures the correctness of a relevance table by comparing the results produced by this relevance table and the labeling results from the users. Relevance aggregation processor 202 may model the function F(x) using a linear combination or a non-linear combination. The combination attempts to figure out a weight for each sub-relevance table. These weights are not fixed and are generated based on the values found in the labeling results and/or relevance tables.

In one embodiment, relevance aggregation processor 202 uses a linear combination to generate the single relevance table. In this case, the function F( ) may be modeled as:

$$F(x) = w^T x,$$

where w is a (adaptive) weight vector and x is the vector containing all relevance values between two media programs. X may be a vector and each of its dimension contains a value from a sub relevance table for a certain pair of media programs. The optimal w could be generated by an optimization process, such as by stochastic gradient descent, as follows. First, relevance aggregation processor 202 enumerates the label results. For example, relevance aggregation processor 202 computes a gradient for each labeled tuple, and then aggregates all the gradients to update the weight vector of the model as shown below. For each label result (k, i, j), relevance aggregation processor 202 calculates the gradient of a loss function with respect to the weight vector. This may be calculated using:

$$\frac{\partial L}{\partial w} = \frac{\alpha(x_j - x_i)}{\exp(\alpha(x_i - x_j)) + \exp(\alpha(x_j - x_i)) + 2}.$$

This formula calculates the gradient of the objective function L with respect to the weight vector. A gradient is a vector with the same dimension as the weight vector and represents the direction of the greatest weight increase of the objective function L.

Then, relevance aggregation processor 202 updates the weight vector using:

$$w_{t+1} = w_t - \lambda \frac{\partial L}{\partial w}\bigg|_{w_t}.$$

The weight vector $w_t$ is the weight vector in the t-th iteration and $w_{t+1}$ is the weight vector in the t+1-th iteration and $\lambda$ is the learning rate. This formula updates the weight vector $w_t$ in the previous iteration by subtracting a weighted gradient from it.

The above process is repeated until the weight vector converges or the total loss is lower than a threshold. When this occurs, the sub-relevance tables have been combined into a single relevance table. The combination of relevance tables depends on the labeling results, which are used to determine which values in the sub-relevance tables are more important and given more weight. For example, given the analysis of the labeling results, tables may be given more weight or less weight. For example, if there are two tables A and B, and Table A says: relevance from show A to show B is 0.8, from show A to show C is 0.3; table B says: relevance from show A to show B is 0.6, from show A to show C is 0.9. Without other information, Tables A and B could be combined with equal weights (e.g., 0.5 vs. 0.5) and the relevance from show A to show B is 0.8*0.5+ 0.6*0.5=0.7, and the relevance from show A to show C is 0.3*0.5+0.9*0.5=0.6. If the labeled results indicate: between show B and show C, show C is more relevance to show A, then relevance aggregation processor 202 compares this information with relevance values in tables A and B. Since table A claims show B is more relevance while table B claims show C is more relevance, table B should be assigned a larger weight than table A. For example, relevance aggregation processor 202 increases the weight of table B from 0.5 to 0.6 and decrease the weight of table A from 0.5 to 0.4. Note that relevance aggregation processor 202 increases the weight of the table not just certain values for shows in one embodiment. Due to the size of the tables, relevance aggregation processor 202 needs a process that can do the adjustment automatically.

Particular embodiments may use a non-linear or additive combination. In this case, the function F( ) may be modeled using a regression process, such as a boosted regression tree, as follows:

$$F(x) = \lim_{t \to \infty} F_t(x) = \sum_{k=1}^{t} \beta_k f_k(x),$$

where $F_t(x)$ is a scoring function in the t-th iteration and $F(x)$ is the final scoring function and $\beta_k$ is the weight of $F_{k(x)}$. In one example, $f_t(x)$ is a one-level tree (that is, $f_t(x)$ maps the values from a particular relevance table to two values such as 0 and 1) and $\beta_k$ is the corresponding multiplier. This formula models the function F(x) as an addition of sub-relevance tables. The function F( ) is initialized. Then, the gradient boosting method is used to get the sub-optimal F( ). First, relevance aggregation processor 202 computes the pseudo-residuals for each item as follows:

$$r_{it} = \frac{\partial L}{\partial F(x_i)}\bigg|_{F(x)=F_{t-1}(x)}$$

In this equation $r_{it}$ is the pseudo-residual that measures the prediction error on each item. Then, relevance aggregation processor 202 fits a sub-model $f_t(x)$ to the pseudo-residuals $\{x_i, r_{it}\}_{i=1}^N$, where $r_{it}$ is the pseudo-residual and $x_i$ is a vector that contains all the relevance values between two shows and N is the size of the training set. $\{x_i, r_{it}\}_{i=1}^N$ with t=1 is the labeling results. $\{x_i, r_{it}\}_{i=1}^N$ with t>1 contains the information of the original labeling results and sub-models obtained before step t. The fitting is doing a regression task to fit the labeling results and sub-relevance tables.

Then, relevance aggregation processor 202 computes the multiplier using:

$$\beta_t = \underset{\beta}{\arg\min} L \bigg|_{F=F_{t-1}+\beta f_t},$$

where $\beta_t$ is the weight of $F_{k(x)}$, F is the final scoring function, $F_{t-1}$ is the scoring function in the (t−1)-th iteration, and $F_t$ is the sub-model in the t-th iteration.

Relevance aggregation processor 202 then updates the model using:

$$F_t(x) = F_{t-1}(x) + \beta_t f_t(x).$$

This model updates the model by adding a weighted sub-model to the current scoring function. The weight was calculated above for $\beta_t$. The above process is repeated until a total loss is below a threshold. Sub-relevance tables are encoded in $f_t(x)$ functions. Relevance aggregation processor 202 then selects sub-relevance tables one by one. In each step, relevance aggregation processor 202 selects the sub-relevance table combined with selected ones ($F_t(x)=F_{t-1}(x)+\beta_t f_t(x)$) that have the lowest loss on the labeling results.

Ties

A label tuple can be judged multiple times by different users and the judgments may not be consistent all the time. This may mean that the labeling results may not be consistent and ties may occur. Relevance aggregation processor 202 may consider ties in the data, such as a pair of destination shows that can be considered equally relevant to the source show. That is, media program B and media program C may be considered fully relevant to media program A.

To address the ties, relevance aggregation processor 202 may define ties explicitly. If a pair ($x_i$, $x_j$) is labeled multiple times, and N people think media program $x_i$ is more relevant than N people think media program $x_j$ is more relevant, then relevance aggregation processor 202 defines ($x_i$, $x_j$) to a tie if and only if:

$$\frac{m}{m+n} \leq \gamma \text{ and } \frac{n}{m+n} \leq \gamma$$

where γ is a pre-defined parameter and the inequalities mean a pair of shows is a tie if and only if the above is true. In other words, nearly the same number of people think media program $x_i$ is more relevance and $x_j$ is more relevant.

For each tie, relevance aggregation processor 202 updates the corresponding pair as follows:

$$l = \frac{1}{1+\exp(\alpha(\theta+F(x_i)-F(x_j)))} + \frac{1}{1+\exp(\alpha(\theta+F(x_j)-F(x_i)))},$$

with

θ>0.

In this case, α is a scaling parameter, $x_i$ is a vector that contains all the relevance values between two media programs, θ is a positive parameter, and F is the scoring function. This formula represents a loss function of ties. For example, when a tie occurs, it will incur an additional loss in the linear or non-linear combinations. The tie function is a loss function defined on a tie ($x_i$, $x_j$). If scores of media programs $x_i$ and $x_j$ are close to each other, the function values will be small. In other examples, relevance aggregation processor 202 can ignore ties.

Generation of an Adjusted Relevance Table

Figure 4:
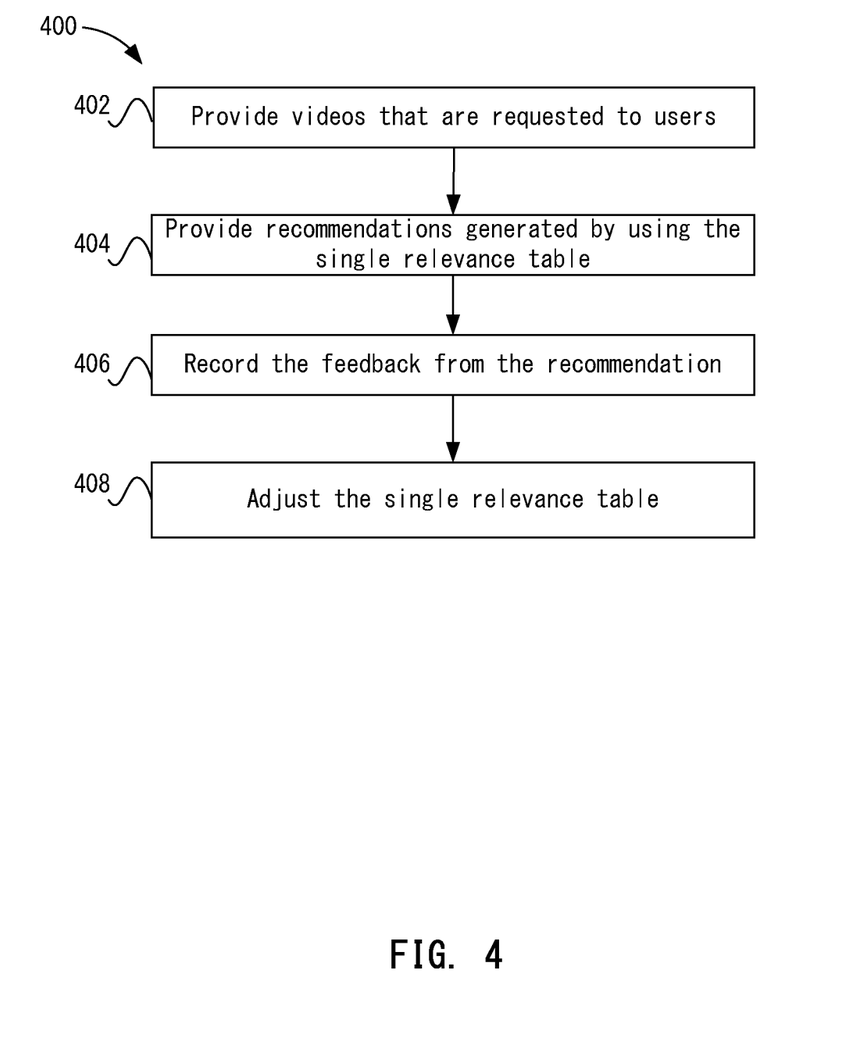
FIG. 4 depicts a simplified flowchart of a method for adjusting the single relevance table according to one embodiment.

FIG. 4 depicts a simplified flowchart 400 of a method for adjusting the single relevance table according to one embodiment. The single relevance table may be adjusted based on some feedback information. For example, the original single relevance table was generated using labeling results of users in combination with the sub-relevance tables. The adjustment of the relevance table uses feedback from users using the video delivery service. Relevance adjustment processor 204 adjusts the single relevance table using the feedback from the user.

At 402, video delivery system 102 provides videos that are requested to users. Then, at 404, video delivery system 102 provides recommendations generated by using the single relevance table. While the users are watching the videos, the recommendations are provided. Users may select the recommendations or provide input based on the recommendations. In one embodiment, the recommendation includes a tray that states: "You may like X media program." If a user clicks on that button, then this may be a positive reinforcement of the recommendation.

At 406, recommendation system 106 records the feedback from the recommendation. For example, the user may or may not select the button for the recommendation. Then, at 408, relevant adjustment processor 204 adjusts the single relevance table. In general, relevance adjustment processor 204 models several qualities related to a media program, such as importance, combined relevance to another media program, adjusted relevance to another media program, and observed user selections. Then, relevance adjustment processor 204 models those together and infers the adjusted relevance.

Figure 5:
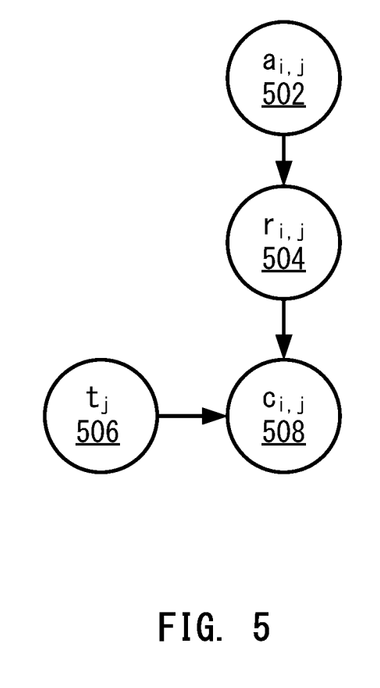
FIG. 5 shows an example of the adjusted relevance table generation according to one embodiment.

FIG. 5 shows an example of the adjusted relevance table generation according to one embodiment. In FIG. 5, the variable $a_{I,J}$ represents the original relevance between a media program I and a media program J. Variable $r_{I,J}$ represents the hidden adjusted relevance between media program I and media program J. Variable $t_J$ is an importance (e.g., current popularity) of media program J. The variable $c_{I,J}$ is the observed user click number when media program I is the source item and media program J is the destination item.

The conditioned distribution shown in FIG. 5 may be modeled as Gaussian distributions as follows:

$$r|a \sim N(a, \sigma_r)$$

$$c|t,r \sim N(w_t t + w_r r, \sigma_c),$$

where $r_{i,j}$ is unknown and is learned. The total observed click number of media program J is $t_j$. Relevance adjustment processor 204 may use an expectation maximization (EM) algorithm to infer the hidden variable r and the parameters:

$$(\sigma_r, \sigma_c, w_t, w_r)$$

For example, relevance adjustment processor 204 samples the variable r several times based on a posterior distribution given the parameters of the previous iteration and the observed data. Given the sample data of the variable r, relevance adjustment processor 204 maximizes the posterior of the observed data with respect to the parameters and updates the parameters for the next iteration. Relevance adjustment processor 204 repeats the above processes until the parameters are stable.

After all the iterations are complete, relevant adjustment processor 204 generates the values for the parameters, and the hidden relevance is retrieved in a maximum a posteriori way. In this case, $r_{i,j}$ is a Gaussian distribution. Its mean is the original relevance $a_{i,j}$ and its variance is $\sigma_r$. $C_{i,j}$ is a Gaussian distribution and its meaning is a linear combination of the adjusted relevance $r_{i,j}$ and the importance $t_j$, and its variance $\sigma_c$. In the above steps, relevance adjustment processor 204 applies the EM algorithm as an iterative algorithm. In each iteration, relevance adjustment processor 204 first infers the distribution of adjusted relevance by using the model parameters obtained in the last iteration (the E step in the EM algorithm). Then, relevance adjustment processor 204 chooses the model parameters by using this distribution (the M step in the EM algorithm). The observed click number, the popularity of the show and the original relevance of the show are known. These quantities as well as the true relevance of the show (what relevance adjustment processor 204 wants to obtain) are related by: the click number is affected by the true relevance of the show and the popularity of the show, the true relevance is related to the original relevance. Given these relationships, if the observed click number is large, then the true relevance of the show should be larger than the original relevance; if the popularity of the show is high, the true relevance of the show should be decreased.

Figure 6:
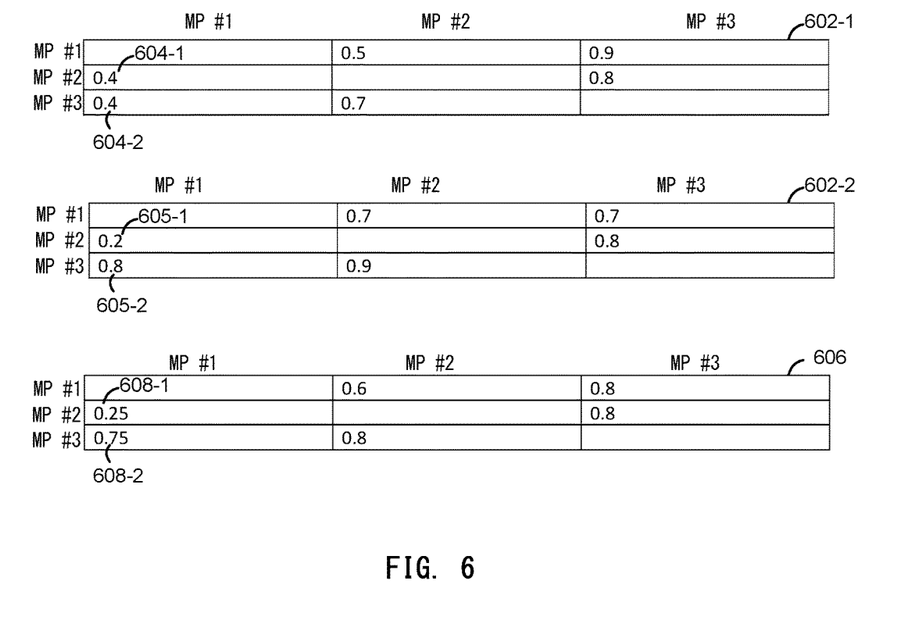
FIG. 6 shows an example of combining sub-relevance tables according to one embodiment.

FIG. 6 shows an example of combining sub-relevance tables according to one embodiment. Three media programs (MP) #1, #2, and #3 are modeled in the tables. Each row and column are associated with the media programs. The intersection of a row and column at a cell captures the relevance value between the media programs.

At 602-1, a first sub-relevance table A is shown, and at 602-2, a second sub-relevance table B is shown. In table A, at 604-1, the entry with the value 0.4 is in the second row and first column and means that the relevance from media program #2 to a media program #1 is 0.4. The other values in the columns flow similarly. For example, at 604-2, this entry is in the third row in the first column and means that the relevance from a media program #3 to a media program #1 is 0.4.

The same is true for sub-relevance table B for the same shows, but for a different feature. For example, sub-relevance table A may be based on watch behavior and sub-relevance table B may be based on search behavior. In table 602-2, at 605-1, the entry with the value 0.2 is in the second row and first column and means that the relevance from media program #2 to a media program #1 is 0.2 for search behavior. Also, at 605-2, this entry is in the third row in the first column and means that the relevance from a media program #3 to a media program #1 is 0.8 for search behavior.

Relevance table processor 108 combines the two sub-relevance tables into one to capture the effect of both features. Although not shown, the labeling results may indicate that the values for sub-relevance table 602-2 are more important than the values from sub-relevance table 602-1.

At 606, relevance table processor 108 has generated a single relevance table. In this case, the values for sub-relevance table A and sub-relevance table B have been combined. Relevance aggregation processor 202 may combine the values based on the above methods, such as using user labeling results and also user feedback. Relevance table processor 108 uses this data to automatically combine the sub-relevance tables. In the single relevance table, the importance of each sub-relevance table is not pre-defined but determined by external data. Furthermore, since the combination is algorithmic, a more complex combination method may be used instead of adding relevance tables together. For example, at 608-1, the combined relevance for show #2 to show #1 is 0.25. This result is different from adding the two tables together and dividing by 2 (equal weight). However, it is possible that sub-relevance table B has been given more importance to the similarity. Further, at 608-2, the combined value is 0.75. In this case, sub-relevance table B may have been given slightly more importance than the value for sub-relevance table A. This is because 0.75 is above the average of the values 0.6 and 0.8.

System Overview

Figure 7:
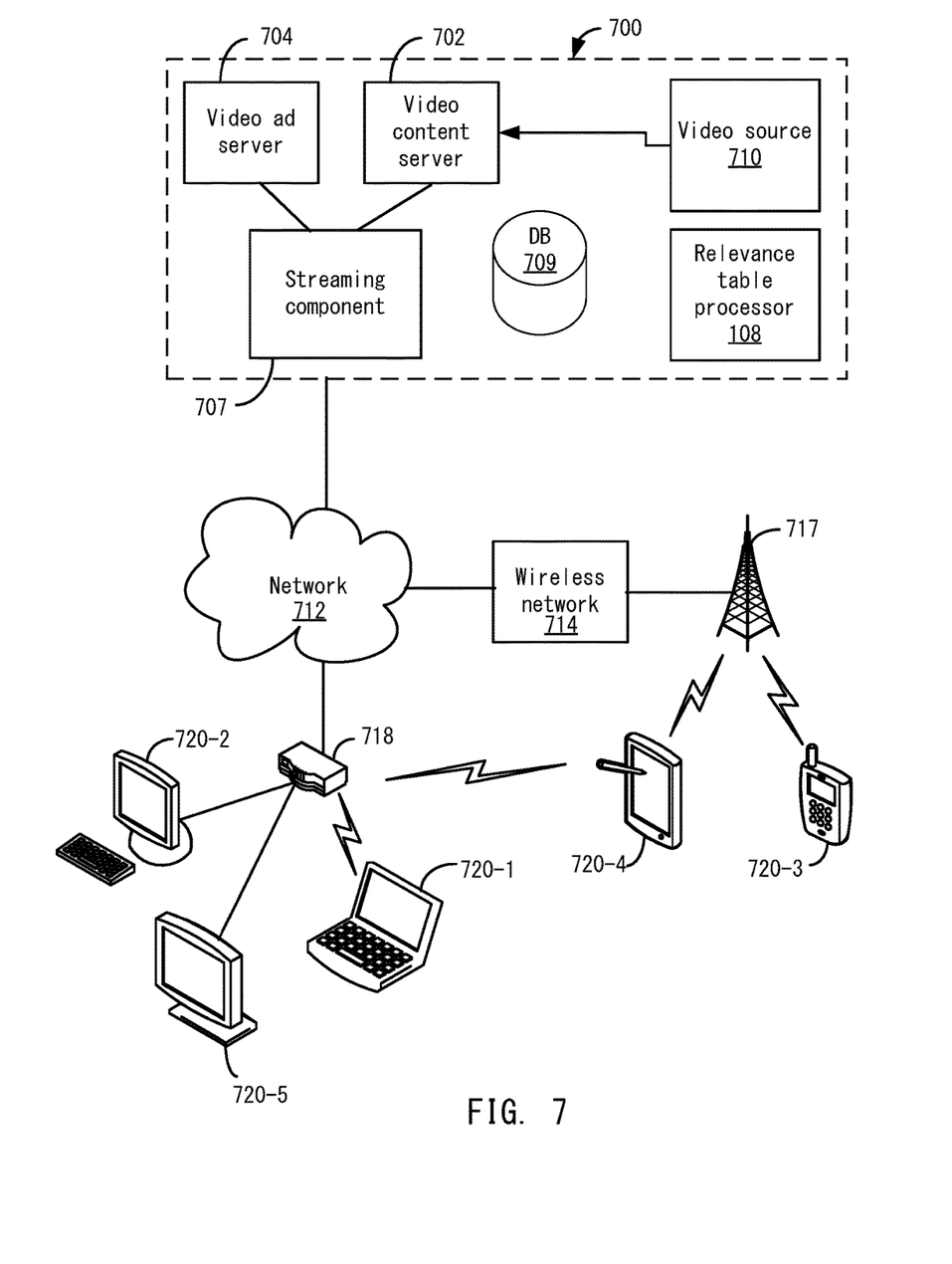
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.274/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 70 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include relevance table processor 108.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712 and/or other network 714. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless telephony network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
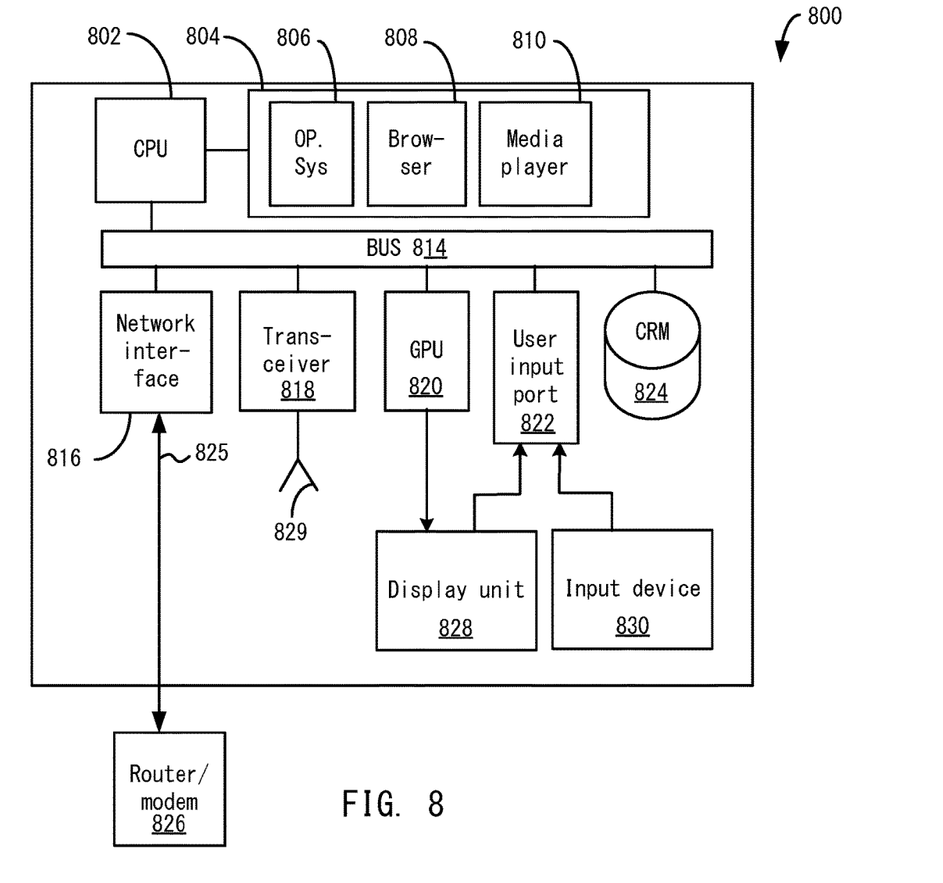
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include modules to provide the recommendations from relevance table processor 108. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
generating, by a computing device, a plurality of sub-relevance tables including a first set of relevance values between a first set of media programs and a second set of media programs being provided by a video delivery service, wherein each table models relevance values relating similarity for a single feature in a plurality of features between the first set of media programs and the second set of media programs;
receiving, by the computing device, labeling results including a second set of relevance values between the first set of media programs and the second set of media programs, the labeling results based on user input;
generating, by the computing device, weights for each of the plurality of sub-relevance tables based on the second set of relevance values for the labeling results and the first set of relevance values of the plurality of sub-relevance tables;
combining, by the computing device, relevance values from the plurality of sub-relevance tables into a single relevance table by applying respective weights for each of the plurality of sub-relevance tables to the relevance values, wherein the single relevance table includes a third set of relevance values relating similarity for the plurality of features between the first set of media programs and the second set of media programs; and
providing, by the computing device, a recommendation to a user using the video delivery service, the recommendation generated using the third set of relevance values from the single relevance table and a characteristic of the user.

2. The method of claim 1, further comprising:
analyzing at least one sub-relevance table in the plurality of sub-relevance tables to generate a plurality of questions regarding relationships between media programs in the first set of media programs and the second set of media programs; and
receiving the user input answering the plurality of questions, the user input used to generate the labeling results.

3. The method of claim 2, wherein a question in the plurality of questions comprises tuples including a relationship between three media programs.

4. The method of claim 3, wherein:
the question asked whether a first media program or a second media program is more relevant to a third media program, and
a selection of the first media program or the second media program is used to generate a labeling result.

5. The method of claim 1, wherein the weights are generated by using a function that measures a correctness of a sub-relevance table by comparing the relevance values for the sub-relevance table to the labeling results.

6. The method of claim 5, wherein the function comprises:

$$L = \sum_{(k,i,j) \in P} \frac{1}{1 + \exp(\alpha(F(x_{k,i}) - F(x_{,j})))},$$

where (k, i, j) and P are the labeling results; $x_{k,i}$ is a vector containing the relevance values from media program k to media program i in the sub-relevance tables, $x_{k,j}$ is a vector containing the relevance values from media program k to media program j in the sub-relevance tables s; α is a scaling parameter, and F( ) is a scoring function with respect to the single relevance table.

7. The method of claim 1, wherein combining the plurality of sub-relevance tables into the single relevance table comprises using a linear combination to combine the weights for each of the plurality of sub-relevance tables.

8. The method of claim 7, wherein the linear combination uses:

$$F(x) = w^T x,$$

where w is a weight vector and x is the vector containing the relevance values between the first set of media programs and the second set of media programs.

9. The method of claim 1, wherein combining relevance values from the plurality of sub-relevance tables into the single relevance table comprises using a non-linear combination to combine the weights for each of the plurality of sub-relevance tables.

10. The method of claim 9, wherein the non-linear combination uses:

$$F(x) = \lim_{t \to \infty} F_t(x) = \sum_{k=1}^{t} \beta_k f_k(x),$$

where $F_t(x)$ is a scoring function in the t-th iteration with respect to the single relevance table and F(x) is a final scoring function with respect to the single relevance table and $\beta_k$ is the weight of $F_{k(x)}$.

11. The method of claim 1, further comprising:
adjusting the single relevance table based on feedback information from users.

12. The method of claim 11, wherein adjusting comprises:
providing a set of recommendations to the user using the single relevance table; and
receiving the feedback information based on a response from the users for the set of recommendations.

13. The method of claim 1, wherein combining relevance values from the plurality of sub-relevance tables into the single relevance table comprises modeling a tie in the labeling results using a function that models the tie.

14. A non-transitory computer-readable storage medium containing instructions, that when executed, control a computer system to be configured for:
generating a plurality of sub-relevance tables including a first set of relevance values between a first set of media programs and a second set of media programs being provided by a video delivery service, wherein each table models relevance values relating similarity for a single feature in a plurality of features between the first set of media programs and the second set of media programs;
receiving labeling results including a second set of relevance values between the first set of media programs and the second set of media programs, the labeling results based on user input;
generating weights for each of the plurality of sub-relevance tables based on the second set of relevance values for the labeling results and the first set of relevance values of the plurality of sub-relevance tables;

combining relevance values from the plurality of sub-relevance tables into a single relevance table by applying respective weights for each of the plurality of sub-relevance tables to the relevance values, wherein the single relevance table includes a third set of relevance values relating similarity for the plurality of features between the first set of media programs and the second set of media programs; and providing a recommendation to a user using the video delivery service, the recommendation generated using the third set of relevance values from the single relevance table and a characteristic of the user.

15. The non-transitory computer-readable storage medium of claim 14, further configured for:

analyzing at least one sub-relevance table in the plurality of sub-relevance tables to generate a plurality of questions regarding relationships between media programs in the first set of media programs and the second set of media programs; and receiving the user input answering the plurality of questions, the user input used to generate the labeling results.

16. The non-transitory computer-readable storage medium of claim 14, wherein the weights are generated by using a function that measures a correctness of a sub-relevance table by comparing the relevance values for the sub-relevance table to the labeling results.

17. The non-transitory computer-readable storage medium of claim 16, wherein the function comprises:

$$L = \sum_{(k,i,j) \in P} \frac{1}{1 + \exp(\alpha(F(x_{k,i}) - F(x,j)))},$$

where (k, i, j) and P are the labeling results; $x_{k,i}$ is a vector containing the relevance values from media program k to media program i in the sub-relevance tables, $x_{k,j}$ is a vector containing the relevance values from media program k to media program j in the sub-relevance tables s; α is a scaling parameter, and F( ) is a scoring function with respect to the single relevance table.

18. The non-transitory computer-readable storage medium of claim 14, wherein combining comprises using a linear combination of:

$$F(x) = w^T x,$$

where w is a weight vector and x is the vector containing the relevance values between the media programs.

19. The non-transitory computer-readable storage medium of claim 14, wherein combining comprises using a non-linear combination of:

$$F(x) = \lim_{t \to \infty} F_t(x) = \sum_{k=1}^{t} \beta_k f_k(x),$$

where $F_t(x)$ is a scoring function in the t-th iteration with respect to the single relevance table and F(x) is a final scoring function with respect to the single relevance table and $\beta_k$ is the weight of $F_{k(x)}$.

20. An apparatus comprising:

one or more computer processors; and a non-transitory computer-readable storage medium comprising instructions, that when executed, control the one or more computer processors to be configured for:

generating a plurality of sub-relevance tables including a first set of relevance values between a first set of media programs and a second set of media programs being provided by a video delivery service, wherein each table models relevance values relating similarity for a single feature in a plurality of features between the first set of media programs and the second set of media programs;

receiving labeling results including a second set of relevance values between the first set of media programs and the second set of media programs, the labeling results based on user input;

generating weights for each of the plurality of sub-relevance tables based on the second set of relevance values for the labeling results and the first set of relevance values of the plurality of sub-relevance tables;

combining relevance values from the plurality of sub-relevance tables into a single relevance table by applying respective weights for each of the plurality of sub-relevance tables to the relevance values, wherein the single relevance table includes a third set of relevance values relating similarity for the plurality of features between the first set of media programs and the second set of media programs; and providing a recommendation to a user using the video delivery service, the recommendation generated using the third set of relevance values from the single relevance table and a characteristic of the user.

* * * * *

UNITED STATES PATENT AND TRADEMARK OFFICE
CERTIFICATE OF CORRECTION

PATENT NO. : 10,271,103 B2
APPLICATION NO. : 15/019672
DATED : April 23, 2019
INVENTOR(S) : Lutfi Ilke Kaya et al.

It is certified that error appears in the above-identified patent and that said Letters Patent is hereby corrected as shown below:

In the Claims

In Column 19, Claim 17, Line 31, please delete:

" $$L = \sum_{(k,i,j) \in P} \frac{1}{1 + \exp(\alpha(F(x_{k,i}) - F(x_{,j}))}, $$ "

And insert:

-- $$L = \sum_{(k,i,j) \in P} \frac{1}{1 + \exp(\alpha(F(x_{k,i}) - F(x_{k,j})))}, $$ --

Signed and Sealed this
Third Day of September, 2019

Andrei Iancu
*Director of the United States Patent and Trademark Office*